United States Patent [19]

Moore et al.

[11] Patent Number: 5,602,703
[45] Date of Patent: Feb. 11, 1997

[54] RECORDING HEAD FOR RECORDING TRACK-CENTERING SERVO SIGNALS ON A MULTI-TRACK RECORDING MEDIUM

[75] Inventors: John Moore, Mission Viejo; Keith Larsen, Aliso Viejo, both of Calif.

[73] Assignee: Seagate Technology, Inc., Scotts Valley, Calif.

[21] Appl. No.: 361,773

[22] Filed: Dec. 27, 1994

[51] Int. Cl.⁶ .............................. G11B 5/02; G11B 5/187; G11B 5/23
[52] U.S. Cl. .................... 360/121; 360/122; 360/125; 360/134; 360/77.12
[58] Field of Search ................. 360/77.12–77.16, 360/119–126, 63, 66, 134

[56] References Cited

U.S. PATENT DOCUMENTS

| | | | |
|---|---|---|---|
| 4,107,751 | 8/1978 | Shimoda | 360/122 |
| 4,979,051 | 12/1990 | Eggenbeen | 360/121 |
| 4,996,609 | 2/1991 | Joannou | 360/121 |
| 5,121,270 | 6/1992 | Alcdia et al. | 360/134 |
| 5,229,895 | 7/1993 | Schwarz et al. | 360/77.12 |
| 5,307,217 | 4/1994 | Saliba | 360/121 |
| 5,321,570 | 6/1994 | Behr et al. | 360/121 |
| 5,394,285 | 2/1995 | Sundaram | 360/121 |
| 5,408,366 | 4/1995 | Bentley et al. | 360/53 |
| 5,453,887 | 9/1995 | Negishi et al. | 360/77.12 |

FOREIGN PATENT DOCUMENTS

| | | |
|---|---|---|
| 0069548A1 | 12/1983 | European Pat. Off. . |
| 0517531A2 | 9/1992 | European Pat. Off. . |
| 0562563A2 | 9/1993 | European Pat. Off. . |
| 0630001A2 | 12/1994 | European Pat. Off. . |
| 62-273615 | 11/1987 | Japan ......... 360/121 |
| WO89/09466 | 5/1989 | WIPO . |

Primary Examiner—Jefferson Evans
Attorney, Agent, or Firm—Kinney & Lange

[57] ABSTRACT

A system to write a servo signal pattern onto a recording medium incorporating a transducer with a full-width write head, and one or more slotted erase head(s). The full-width write head is used to record signals across the full width of the recording medium; the erase head(s) is used to erase "nulls" in the servo signal pattern. The resulting servo pattern has an extremely good match of signal characteristics between the different portions of the resulting signal pattern, since the recorded patterns were all written in the same pass by the same write head. The use of precisely fabricated and aligned erase head(s) results in a very accurate signal pattern.

39 Claims, 5 Drawing Sheets

RECORDING HEAD FOR RECORDING TRACK-CENTERING SERVO SIGNALS ON A MULTI-TRACK RECORDING MEDIUM

FIELD OF THE INVENTION

This invention relates generally to magnetic storage devices, and more particularly to a recording head for recording servo signals on a tape with high mechanical precision, providing an accurate reference for use in placing recorded tracks on recording media.

BACKGROUND OF THE INVENTION

Increasing the amount of data recorded on a given surface area of a recording medium, i.e., a tape, is a continuing endeavor of manufacturers. It is essential to the goal of increased data densities to store each magnetic data signal on the smallest possible surface area of the recording medium while retaining the capability of reliably recovering the data stored on the recording medium.

An impediment to accurate recording and recovery of the data stored on narrow, closely spaced, tracks is lateral wander of the recording medium as it moves longitudinally over the recording head. As data tracks are narrowed and placed closer together, the spacing between the tracks cannot accommodate the lateral wander of the recording medium, and consequently a transducer initially aligned to one track may become misaligned as the recording medium is transported past the transducer. Tape wander may take the form of excursions of comparatively large magnitude, both longitudinally to and laterally with respect to the transducer, especially during stopping and starting conditions, but also during steady state transport. These large excursions make accurate alignment of the recording head relative to the recording medium particularly difficult. Because of the above mentioned excursions and the non-uniformity of tape movement, accurate alignment of the recording head relative to the recording medium becomes increasingly important as track density increases and the tracks are arranged closer together.

To compensate for lateral tape wander and in an effort to maintain recording head position relative to the recording medium, servo systems have been developed which physically manipulate the recording head position in response to that of the recording medium as it is transported past the head. These servo systems use servo tracking centering signals prerecorded on a recording medium as a reference for the recording head and continuously adjust the position of the recording head relative to any selected one of several long tracks of servo signals prerecorded on the tape.

Although these servo tracking systems allow for significant reduction in the track width and the space between the tracks on the recording medium, the ability of manufacturers of magnetic storage systems to make further reductions in the track width, and the space in between the tracks on the record member, is limited by the ability of transducers to accurately record servo-tracking signals which are narrower and spaced closer together.

Some transducers for writing servo tracking centering signals on a recording medium use a write core which sequentially writes the servo tracking signals for each track by embedding the sensoring signals on the recording medium one track at a time. Consequently, the servo system is required to accurately, and with high precision, position the transducer on each track as the write core records the tracking signal for that track. Due to the excursions of the recording medium relative to the transducer head, both laterally and longitudinally, which occur during stopping and starting as well as steady state transport of the recording medium, since the tape is under a tension as it is transported lengthwise, it is difficult and impractical for a system using a single track write core to accurately align servo tracking centering signals longitudinally and laterally as the number of tracks on the recording medium increases.

In addition to the difficulties encountered in accurately positioning the single track transducer for recording the servo tracking centering signals due to lateral excursions of the recording medium, and longitudinal offset due to repeated transport of the storage media past the transducer, expanded writing centering signals increases as the number of tracks increase. This increase occurs because the entire length of the recording medium must be transported past the transducer as the centering signals for each individual track of the recording medium is recorded. For storage media having a large number of tracks, the time required to repeatedly transport the storage media past the transducer and record the centering signals becomes excessively large.

Multi-gap transducers are known which are capable of reading or writing signals from a plurality of different data tracks simultaneously. However, these transducers have a number of characteristics which prevent them from being truly effective or desirable for recording multiple-track servo-tracking signals for high density data storage. For example, stacked-core transducers have multiple cores which are magnetically isolated from one another and have gaps which are spaced apart by a distance of at least one track width. These transducers are relatively complex in construction and thus are costly to manufacture due to the number of cores and windings which make up the transducer. Additionally, the physical dimensions of each of the cores which form the respective gaps of each stacked-core transducer limit the number of cores which can be stacked for a particular width of tape due to the thickness of material required to give the legs of the core structural strength and a geometry for generating flux in the recording medium. The width of the respective cores added to the thickness of the magnetic insulator between each core essentially prevents the use of stacked-core transducers to record adjacent, closely spaced tracks.

In an improved process, a special recording head is used which has "slots" cut into the write head corresponding to the spacing between the bursts in the recorded servo signal pattern. Since no signal is written underneath the region corresponding to the slots, the "above" center line burst patterns for all written tracks can be written in a single pass across the media, then the "below" center line burst patterns for all written tracks can be written in a subsequent pass. The match between the signal characteristics, which is a critical part of the subsequent usage of the signals for positioning, is fair between the "above" and "below" burst patterns, since they are written by the same write head, but some differences can be observed due to the fact that they were written in two separate passes across the media, and possibly the use of write operations in different directions across the recording medium.

In an alternative process, two separate slotted write heads can be implemented, again with the slot size corresponding to the desired space in between the bursts in the recorded pattern. However, signal characteristics of bursts written by two separate write heads will not always match well, so that an error in decoding position information will result. Most of the aforementioned systems require multiple passes over the media in order to write the desired servo pattern. In addition to the signal mismatch due to multiple passes, the processing time required to write the pattern also increases.

SUMMARY OF THE INVENTION

The present invention solves the aforementioned and related problems of accurately writing track centering servo signals on a recording medium. The present invention discloses a transducer having a full-width write head which records signals across the full width of the recording medium, then uses precisely fabricated and aligned slotted erase head(s) to erase out the "nulls" in the desired pattern. This results in extremely well matched signals, since they are all written in the same pass by the same write head.

An advantage of the present invention is the ability to record precisely aligned servo signals on a recording medium to eliminate the error in the calculation of the servo position signal.

Another advantage of the present invention is the ability to achieve much higher efficiency in the creation of the recorded signals on the recording medium by recording all required signals in a single pass over the recording medium.

A feature of the present invention is that the slotted erase head(s) are precisely fabricated and aligned so that the resulting pattern is extremely accurate.

Another feature of the present invention is that the mechanical relationship between the write head and the erase head(s) are controlled so that the head can be used to produce the desired signal pattern in a single pass of the recording medium across the head.

BRIEF DESCRIPTION OF THE DRAWINGS

These and other objects, advantages and features of the present invention will become apparent from the following description, taken in conjunction with the accompanying drawings, in which.

DESCRIPTION OF THE PREFERRED EMBODIMENT

Figure 1:
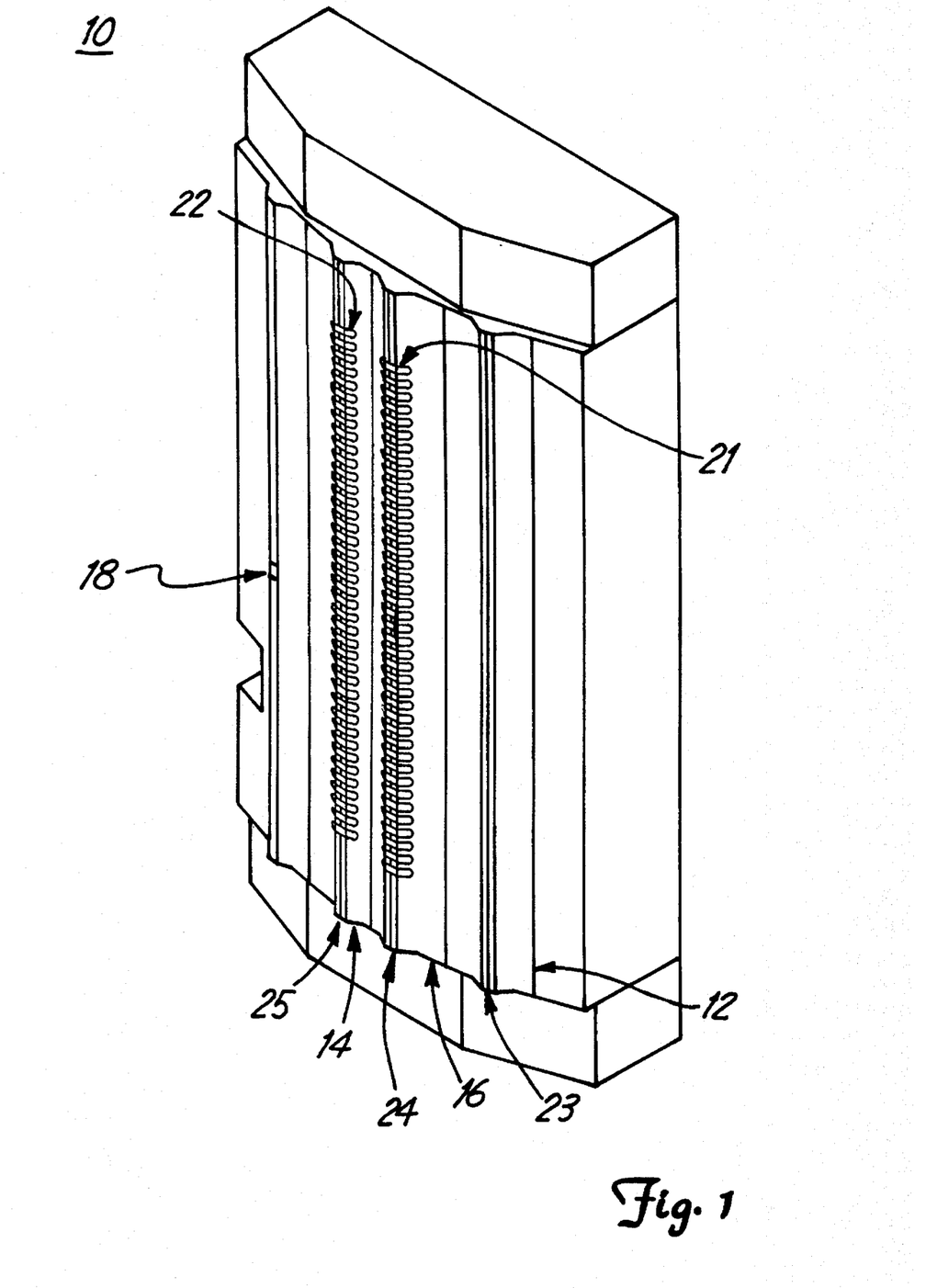
FIG. 1 is an isometric view of a recording head according to the present invention, illustrating the two slotted erase heads and the full-width write head.

The recording head 10 in the most preferred embodiment of the present invention, for providing the servo signal pattern shown in FIG. 6, will now be described with reference to FIGS. 1–2. The recording head 10 has a core made from a Hot Isostatic Process (HIP'ed) nickel-zinc ferrite material and has a transducer with a full-width (0.4 inch) write head 12 and two full width servo erase heads 14 and 16, having multiple slotted regions 21 and 22 formed therein. The recording head 10 also contains a read head 18 preferably having a width over a range of at least 0.0080 inch to 0.0120 inch, and optimally 0.0100 inch.

The servo erase heads 14 and 16 are positioned on the transducer so that their magnetic erase gaps 24 and 25, respectively, are spaced apart from each other by at least 0.365 inch to 0.0385 inch, and optimally 0.0375 inch. The write head 12 is positioned relative to the nearest erase head 16 such that the magnetic write gap 23 of the write head 12 is separated by a distance of at least 0.0590 inch to 0.0610 inch, and optimally 0.0600 inch from the magnetic erase gap 24 of the nearest servo erase head 16. The magnetic write gap 23 of the write head 12 extends across the entire width of the recording head 10.

Figure 2:
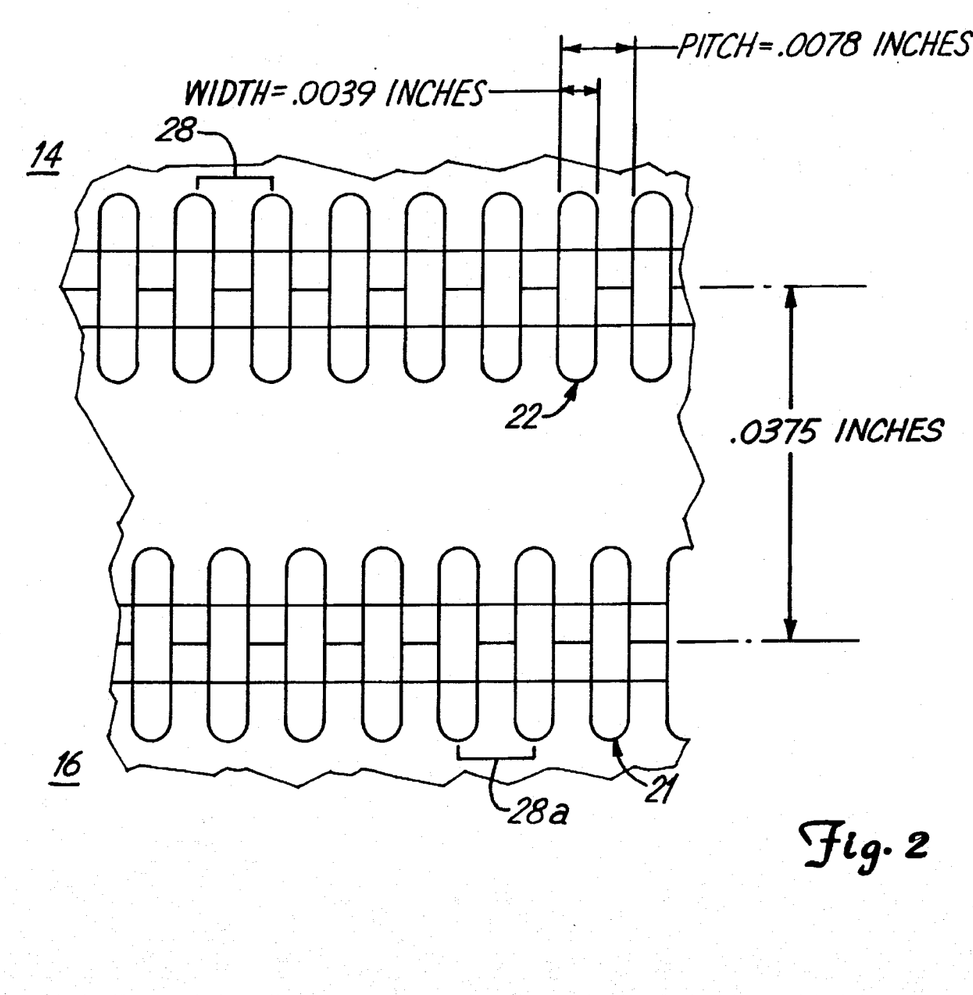
FIG. 2 is an arranged view of the slots of the erase heads.
Figure 3:
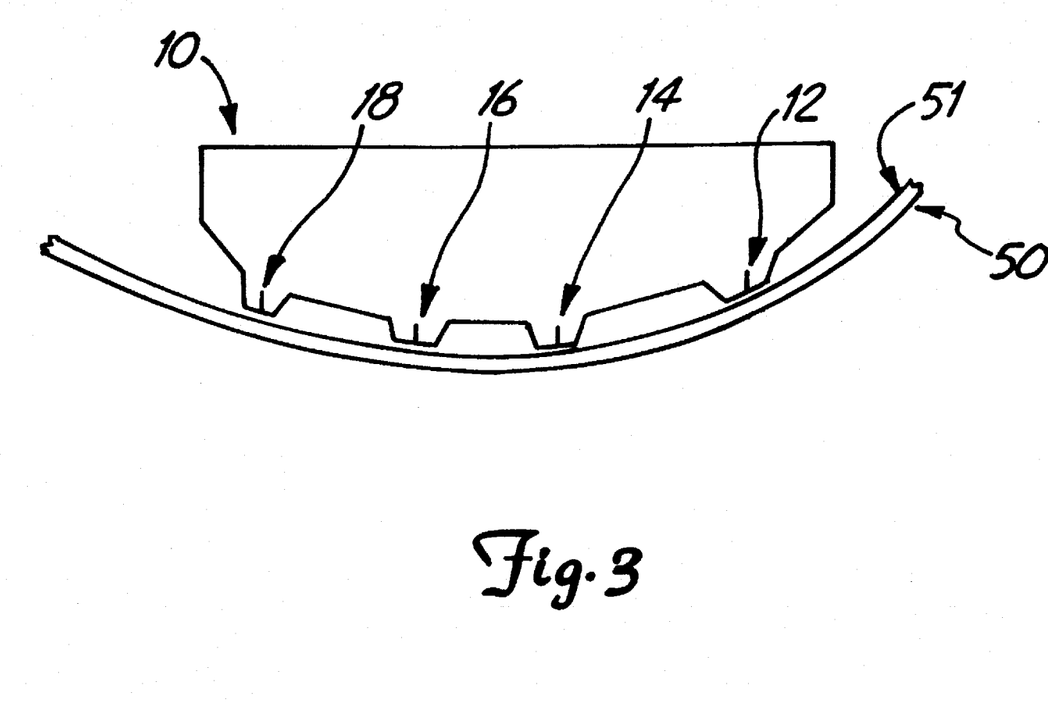
FIG. 3 is an overhead plan view of the device shown in FIG. 1, shown with a recording medium contacting the recording head.

As shown in greater detail in FIG. 2, the multiple slotted regions 21 and 22 formed on servo erase heads 16 and 14, respectively, extend substantially in parallel to one another along the width of the recording head 10. The slotted regions 21 and 22 preferably have a width over a range of 0.0038 inch to 0.0040 inch, and optimally 0.0039 inch, and a pitch along the width of the recording head 10 over a range of 0.0077 inch to 0.0079 inch, and optimally 0.0078 inch. Servo erase heads 14 and 16 are substantially identical, and accordingly, only erase head 14 will be described in greater detail hereinafter. It is to be understood that the description of the servo erase head 14 applies equally to the other servo erase head 16 aside from the differences pointed out below.

The slotted portion 22 of erase head 14 is formed by machining slots 28 into the erase head 14, then back-filling the slots 28 with glass or other suitable substances. The slots 28 of slotted region 22 preferably have a total width over a range of at least 0.0038 inch to 0.0040 inch, and optimally 0.0039 inch, and the pattern of the slotted region 22 along the servo erase head 14 is laid out so that the slots 28 have a pitch along the width of the servo erase head 14 of at least 0.0077 inch to 0.0079 inch, and optimally 0.0078 inch. As further seen in FIG. 2, the slotted region 21 on the servo erase head 16 is aligned relative to the slotted region 22 on the servo erase head 14 such that these regions are offset over a range of at least 0.0038 inch to 0.0040 inch, and optimally 0.0039 inch, so that the width, pitch and alignment will determine the track pitch and alignment of the final desired servo burst pattern. The slotted region 21 of servo erase head 16 is also formed by machining slots 28a into servo erase head 16, then back-filling the machined slot 28a with glass or other suitable substances.

Figure 4:
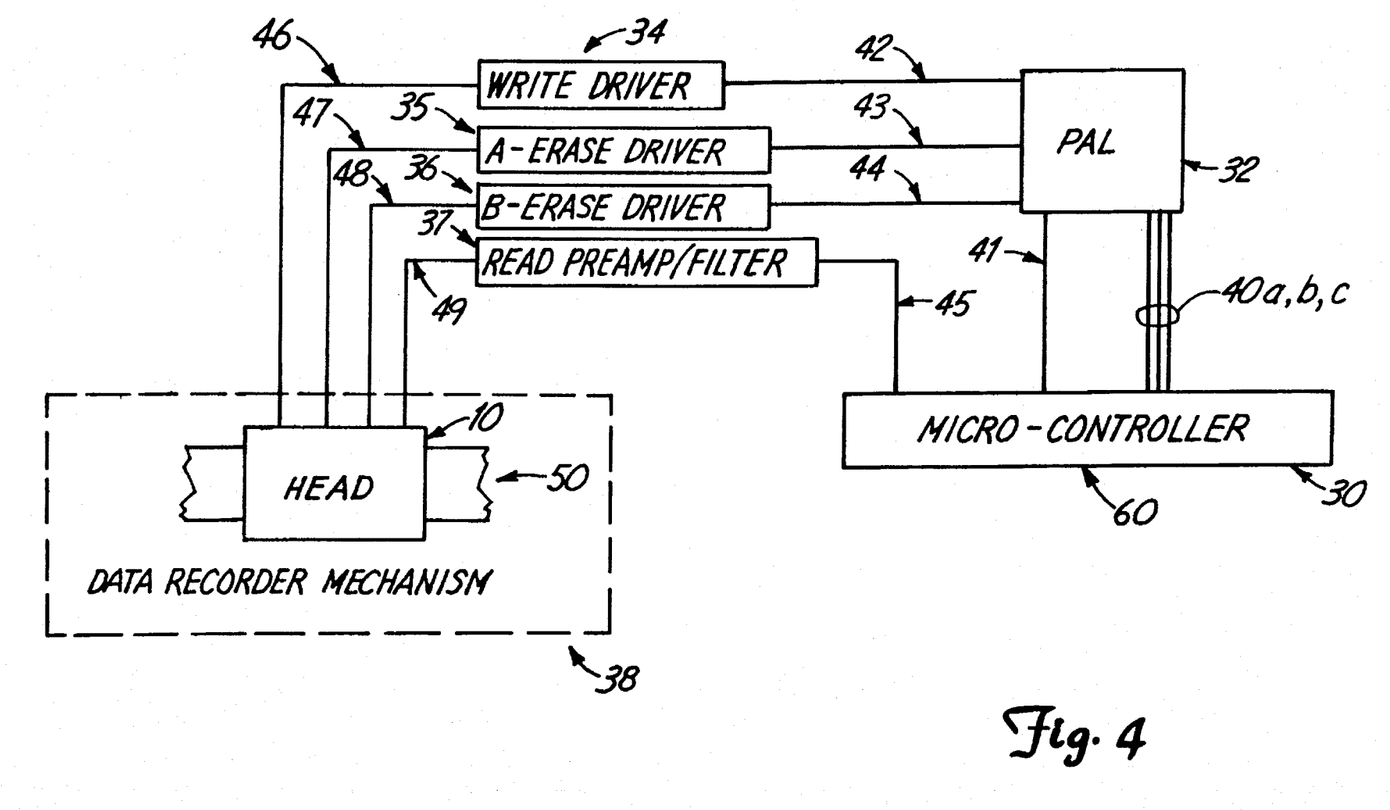
FIG. 4 is a system block diagram showing the nature of the storage apparatus (recording head and recording medium) used with the invention.
Figure 5:
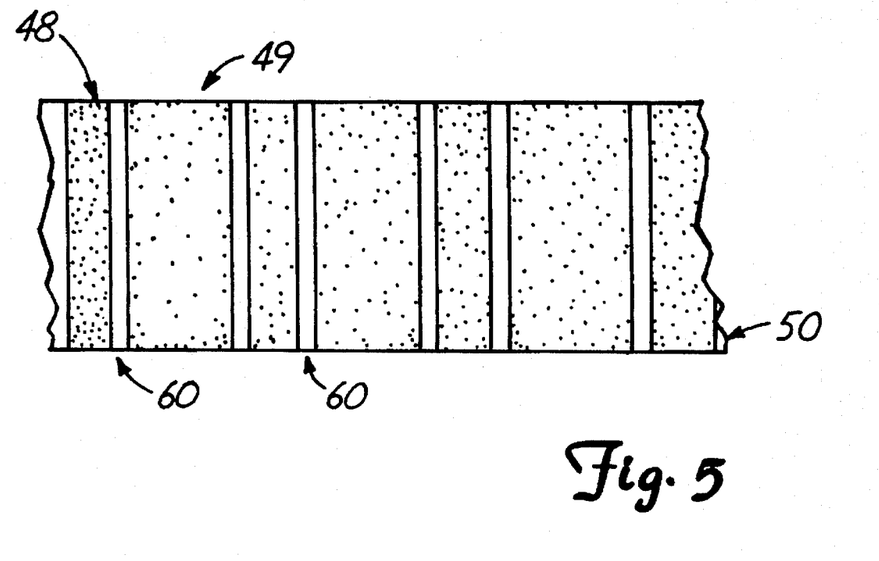
FIG. 5 is an enlarged, fragmentary schematic view of the recording medium after being written to by the recording head according to the present invention.

The micro-controller 30 which controls the operation of the write head 12, the servo erase heads 14 and 16, and the read head 18 is shown in schematic form in FIG. 4. The micro-controller 30 sends control signals to a plurality of state machines located in programmable array logic (PAL) circuit 32 via signal lines 40a–c. The output of one state machine contained within the PAL 32 is sent to the write driver 34 via line 42, whose output is sent to the write head 12 on the recording head 10 via line 46. The output of the other two state machines contained within the PAL 32 are sent to the A-erase driver 35 and the B-erase driver 36 via lines 43 and 44, respectively. The outputs from the A-erase driver 35 and the B-erase driver 36 are sent to servo erase heads 14 and 16 via lines 47 and 48, respectively, for controlling the erasing of the bursts on the recording medium. A cycle count signal from the PAL 32, which informs the microcontroller 30 of how many servo burst patterns have been formed on the recording medium, is fed back to the micro-controller 30 via line 41. The micro-controller 30 also reads back calibration signal information from the read head 18 which transmits the information signal from the recording head 10 via line 49 to the Read Preamp/filter circuit 37, which transmits the information to the micro-controller 30 via line 45. The operation of the data recorder mechanism 38 is also controlled by the micro-controller 30 via line 60. The control of the data recorder 38 is understood by those of ordinary skill in the art and shall not be discussed further herein.

Figure 6:
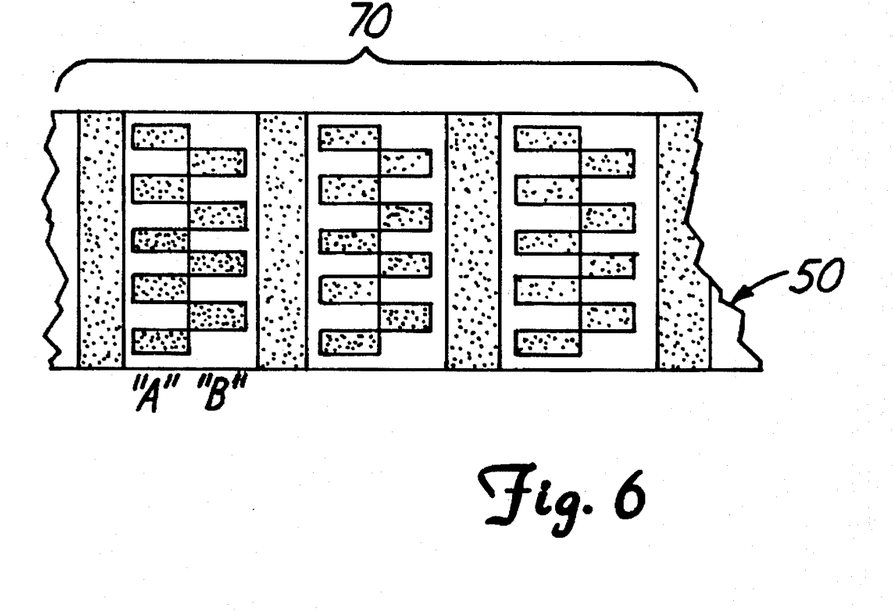
FIG. 6 is an enlarged, fragmentary schematic view of the recording medium after having the servo burst pattern erased out by the recording head according to the present invention.

The operation of how the recording head 10 writes the servo burst pattern as seen in FIG. 6 will now be described with references to FIGS. 3–6. When the recording medium 50 propagates across the recording head in direction P, the data recorder mechanism 38 detects the end of tape (EOT) hole of the recording medium 50. The EOT detection signal is then transmitted to the micro-controller 30 which transmits a signal on line 42 to the write driver 34, which then sends an activation signal to the write head 12 via line 46. When the write head 12 is activated, the magnetic write gap 23 is energized and writes a magnetic stripe 48 preferably having a length over a range of at least 0.017 inch to 0.023 inch, and optimally 0.020 inch on the storage surface 51 of the recording medium 50. The write head 12 is then deactivated long enough to leave a 0.0070 inch to 0.0130 inch, and optimally a 0.010 inch long gap 60 on the storage surface 51 of the recording medium 50. Once the write head 12 has been deactivated long enough to leave the gap 60 on the storage surface 51 of the recording medium 50, the write head 12 is then reactivated and the magnetic write gap 23 is energized to write another magnetic stripe 49 preferably having a length over a range of at least 0.0570 inch to 0.0630 inch, and optimally 0.06 inch onto the storage surface 51 of the recording medium 50. The write head 12 is then deactivated long enough to leave another gap 60 preferably having a length over a range of at least 0.0070 inch to 0.0130 inch, and optimally 0.010 inch on the storage surface 51 of the recording medium 50. This pattern of approximately 0.02 inch stripe, approximately 0.01 inch gap, approximately 0.06 inch stripe, and approximately 0.01 inch gap is repeated until there are a total of 575 such patterns written on the storage surface 51 of the recording medium 50.

At approximately the same period that the write head 12 is deactivated after writing the approximately 0.02 inch long gap 60 on the storage surface 51 of the recording medium 50, the micro-controller 30 transmits control signals to the PAL 32 via lines 40 which activate the A-erase driver 35 and B-erase driver 36, via lines 43 and 44, respectively, which further activate the servo erase heads 14 and 16, respectively. When the servo erase head 16 is activated, the magnetic erase gap 24 is energized and proceeds to erase out a void pattern preferably having a length over a range of at least 0.0270 inch to 0.0330 inch, and optimally 0.030 inch on the storage surface 51 of the recording medium 50 which represented by the area "A" in FIG. 6. At approximately the same period, the magnetic erase gap 24 of the servo erase head 14 is energized, and proceeds to erase out a void pattern preferably having a length over a range of 0.0270 inch to 0.0330 inch, and optimally 0.030 inch on the storage surface 51 of the recording medium 50 which further represented by the area "B" in FIG. 6. The PAL 32 is programmable with adjustments to the exact timing between the write head 12 and the servo erase heads 14 and 16, so that mechanical tolerances on the recording head 10 and the data recorder mechanism 38 may be compensated for, thereby resulting in the accurate generation of the servo burst pattern 70 shown in FIG. 6. The above described procedure of the having the micro-controller 30 and PAL 32 activate and deactivate the write head 12 and the servo erase heads 14 and 16, respectively is repeated until the servo pattern 70 has been placed on the entire recording medium 50 for a total of 575 servo burst patterns.

The foregoing description of a preferred embodiment of the invention has been presented for purposes of illustration and description. It is not intended to be exhaustive or to limit the invention to the precise form disclosed, and obviously many modifications and variations are possible in light of the above teaching. The head for writing servo signals onto a tape was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claims is:

1. A recording head for recording servo tracking signals on a multitrack recording medium, comprising:

a write head operative to write a servo signal as a magnetic stripe across the full width of a plurality of tracks; and an erase head coupled to the write head to erase a portion of the servo signal in the magnetic stripe to form a servo burst pattern in the magnetic stripe, the servo burst pattern consisting of a plurality of servo bursts along the tracks formed solely of portions of the servo signal in the magnetic stripe wherein a servo signal pattern that includes the servo burst pattern is recorded in one pass.

2. The recording head of claim 1, further including a read head operative to read the servo signal pattern.

3. The recording head of claim 1, wherein the erase head comprises a first erase head having first slots machined therein and a second erase head having second slots machined therein.

4. The recording head of claim 3, wherein the first erase head and the second erase head are separated by a distance of about 0.0375 inch.

5. The recording head of claim 3, wherein each slot of the second slots is offset from a slot of the first slots along the width of the plurality of tracks.

6. The recording head of claim 5, wherein the first slots and the second slots are substantially parallel.

7. The recording head of claim 5, wherein each slot of the first and second slots has a width approximately equal to the offset.

8. The recording head of claim 7, wherein the slots have a width of about 0.0039 inch.

9. The recording head of claim 1, wherein the write head has a width of about 0.4 inch.

10. The recording head of claim 1, further including a read head responsive to the servo signal in the magnetic stripe.

11. Apparatus for recording servo tracking signals on a multi-track recording medium, comprising:

a transducer having
      a write head having a gap, the write head gap having a width across the full width of a plurality of tracks,
      an erase head having an erase head gap, the erase head gap having a width approximately equal to the write head gap, the erase head having slots machined across the erase head gap to write an erase pattern, and
   a read head responsive to a servo signal recorded on the medium; and
      a controller operative to control the write head, the erase head and the read head to write a servo signal as a magnetic stripe across the full width of the plurality of tracks and write an erase pattern over the servo signal to form a servo burst pattern consisting of a plurality of servo bursts along the tracks formed solely of portions of the servo signal.

12. The apparatus of claim 11, further including a second erase head coupled to the first erase head and having slots machined therein, the second erase head having an erase head gap having a width approximately equal to the write head gap, the second erase head having slots machined across its erase head gap to write a second erase pattern, the first erase head and the second erase head being disposed generally parallel to one another on the transducer, the controller being operable to control the second erase head to erase a portion of the servo signal in the magnetic stripe to form a servo burst pattern in the magnetic stripe.

13. The apparatus of claim 12, wherein the controller includes circuitry operative to generate control signals and circuitry responsive to the control signals for controlling the operation of the write head and the first erase head and the second erase head.

14. The apparatus of claim 12, wherein the erase head gaps are filled with copper.

15. The apparatus of claim 11, wherein the slots are back-filled with glass.

16. The apparatus of claim 11, wherein the erase head gap is filled with copper.

17. The apparatus of claim 11, wherein the slots have a width of about 0.0039 inches.

18. Apparatus as claimed in claim 11, wherein the write head has a width of about 0.4 inch.

19. Apparatus of claim 11, further including a programmable array logic circuit responsive to the controller to control the operation of the write head and the erase head so that a servo signal pattern is recorded by the transducer in one pass over the recording medium.

20. A recording transducer head for recording servo tracking signals on a multi-track recording medium, comprising:
  a write head operative to write a servo signal across the full width of a plurality of tracks on a recording medium;
  a first erase head having first slots to write a first erase pattern in the servo signal to erase out a first burst pattern on the servo signal;
  a second erase head having second slots to write a second erase pattern in the servo signal to erase out a second burst pattern on the servo signal; and
  a read head operative to read the servo signal, the first burst pattern, and the second burst pattern to allow automatic calibration of electrical settings for recording head operation, wherein a servo signal pattern is written in one pass.

21. The recording head of claim 20, further including circuitry operative to control the write head, the first erase head, the second erase head and the read head.

22. The recording head of claim 20, wherein the write head has a width of about 0.4 inch.

23. The recording head of claim 20, wherein the first erase head and the second erase head are separated by a distance of about 0.0375 inch.

24. The recording head of claim 20, wherein the first erase head and the second erase head are disposed generally parallel to one another.

25. The recording head of claim 20, wherein the slots are backfilled with glass.

26. The recording head of claim 20, wherein each second slot is offset from a first slot along the width of the plurality of tracks so that the first and second erase patterns are offset along the width of the plurality of tracks.

27. The recording head of claim 26, wherein each of the first and second slots has a width approximately equal to the offset.

28. The recording head of claim 27, wherein the slots have a width of about 0.0039 inch.

29. A method for recording servo tracking signals in a single pass on a multi-track recording medium which comprises steps of:
  (a) writing a servo signal on a magnetic stripe across the full width of a plurality of tracks on the recording medium; and
  (b) selectively erasing a portion of the servo signal on the magnetic stripe to form a servo burst pattern on the magnetic stripe, the servo burst pattern consisting of a plurality of servo bursts along the tracks formed solely of portions of the servo signal on the magnetic stripe.

30. The method of claim 29 wherein step (b) further comprises:
  (c) activating a first erase head to erase a first servo pattern into the magnetic stripe;
  (d) pausing the erasing of the first erase head;
  (e) activating a second erase head to erase a second servo pattern into the magnetic stripe; and
  (f) pausing the erasing of the second erase head.

31. The method of claim 30 wherein the magnetic stripe is written along a length of the plurality of tracks for a predetermined distance and the first and second servo patterns encompass approximately respective halves of the length of the magnetic stripe.

32. A recording head for recording servo tracking signals on a longitudinal multi-track recording medium having a defined width, comprising:
  a write head operative to write a servo signal in a magnetic stripe across the full width of the medium; and
  an erase head coupled to the write head to write an erase pattern in the magnetic stripe different from the servo signal to form a servo burst pattern in the magnetic stripe, the servo burst pattern consisting of a plurality of servo bursts along the tracks formed solely of portions of the servo signal on the magnetic stripe wherein a servo signal pattern is recorded in one pass.

33. The recording head of claim 32, further including a read head operative to read the servo signal pattern.

34. The recording head of claim 32, wherein the erase head comprises a first erase head having first slots machined therein and a second erase head having second slots machined therein.

35. The recording head of claim 34, wherein each slot of the second slots is offset from a slot of the first slots along the width of the plurality of tracks.

36. The recording head of claim 35, wherein each slot of the first and second slots has a width approximately equal to the offset.

37. The recording head of claim 35, wherein the first slots and the second slots are substantially parallel.

38. The recording head of claim 32, wherein the write head has a width of about 0.4 inch.

39. The recording head of claim 32, further including a read head responsive to the servo signal in the magnetic stripe.

* * * * *

UNITED STATES PATENT AND TRADEMARK OFFICE
CERTIFICATE OF CORRECTION

PATENT NO. : 5,602,703

DATED : FEBRUARY 11, 1997

INVENTOR(S) : JOHN MOORE, KEITH LARSEN

It is certified that error appears in the above-indentified patent and that said Letters Patent is hereby corrected as shown below:

Col. 3, line 41, delete "arranged", insert --enlarged--

Signed and Sealed this

Twenty-seventh Day of May, 1997

Attest:

BRUCE LEHMAN

*Attesting Officer*     *Commissioner of Patents and Trademarks*